United States Patent
Johns

(10) Patent No.: US 8,336,586 B2
(45) Date of Patent: Dec. 25, 2012

(54) LOADING SLEEVE AND METHOD FOR LOADING CHEMICAL REACTOR TUBES

(75) Inventor: Clifford L. Johns, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 778 days.

(21) Appl. No.: 12/555,434

(22) Filed: Sep. 8, 2009

(65) Prior Publication Data

US 2010/0059137 A1    Mar. 11, 2010

Related U.S. Application Data

(60) Provisional application No. 61/096,097, filed on Sep. 11, 2008.

(51) Int. Cl.
  *B01J 8/06* (2006.01)
  *B01J 4/02* (2006.01)
(52) U.S. Cl. ............. 141/337; 141/1; 141/374; 141/391
(58) Field of Classification Search ............. 141/1, 337, 141/374, 391
  See application file for complete search history.

(56) References Cited

U.S. PATENT DOCUMENTS

| | | | |
|---|---|---|---|
| 241,597 A | 5/1881 | Confer et al. | |
| 4,149,391 A | 4/1979 | Driver | |
| 4,402,643 A | 9/1983 | Lytton et al. | |
| 4,433,946 A | 2/1984 | Christianson et al. | |
| 4,578,919 A | 4/1986 | Amadon et al. | |
| 4,953,897 A | 9/1990 | Klober | |
| 5,488,979 A * | 2/1996 | McKenzie | 141/337 |
| 7,285,251 B2 * | 10/2007 | Johns et al. | 141/331 |
| 7,353,847 B2 * | 4/2008 | Early | 141/9 |
| 7,458,401 B2 * | 12/2008 | Johns et al. | 141/2 |
| 7,836,919 B2 * | 11/2010 | Johns et al. | 141/391 |
| 2007/0098605 A1 | 5/2007 | Johns et al. | |

FOREIGN PATENT DOCUMENTS

| | | |
|---|---|---|
| DE | 2062601 | 12/1970 |
| JP | 10024232 | 1/1998 |

OTHER PUBLICATIONS

Inventor's sketch of funnel prior to 2006.

* cited by examiner

*Primary Examiner* — Gregory Huson
*Assistant Examiner* — Nicolas A Arnett
(74) *Attorney, Agent, or Firm* — Camoriano and Associates; Theresa Fritz Camoriano; Guillerma Camoriano

(57) ABSTRACT

A loading sleeve and method for loading pellets into chemical reactor tubes where the length of the loading sleeve is greater than the clearance above the upper tube sheet. The loading sleeve includes a rigid upper sleeve portion and a rigid lower sleeve portion extending downwardly from the upper sleeve portion and means for holding the upper and lower sleeve portions together in both an aligned position, in which their longitudinal axes are aligned, and in an unaligned position, in which the longitudinal axes are at a substantial angle relative to each other. The method includes bending the loading sleeve at a hinge means, inserting the lower portion of the loading sleeve into the chemical reactor tube, then straightening the loading sleeve and inserting the upper sleeve portion into the chemical reactor tube.

11 Claims, 14 Drawing Sheets

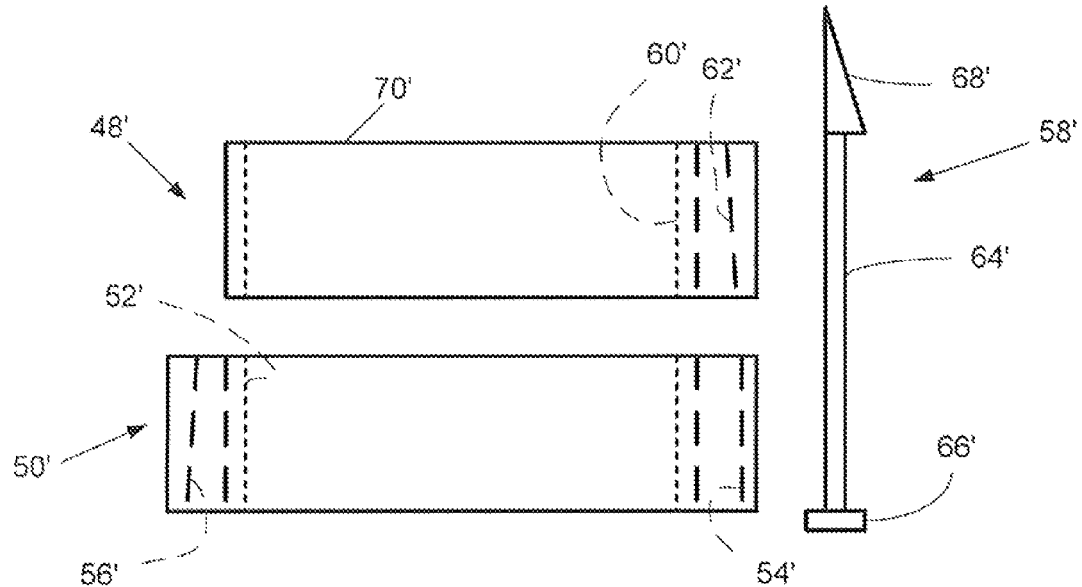
Figure 7
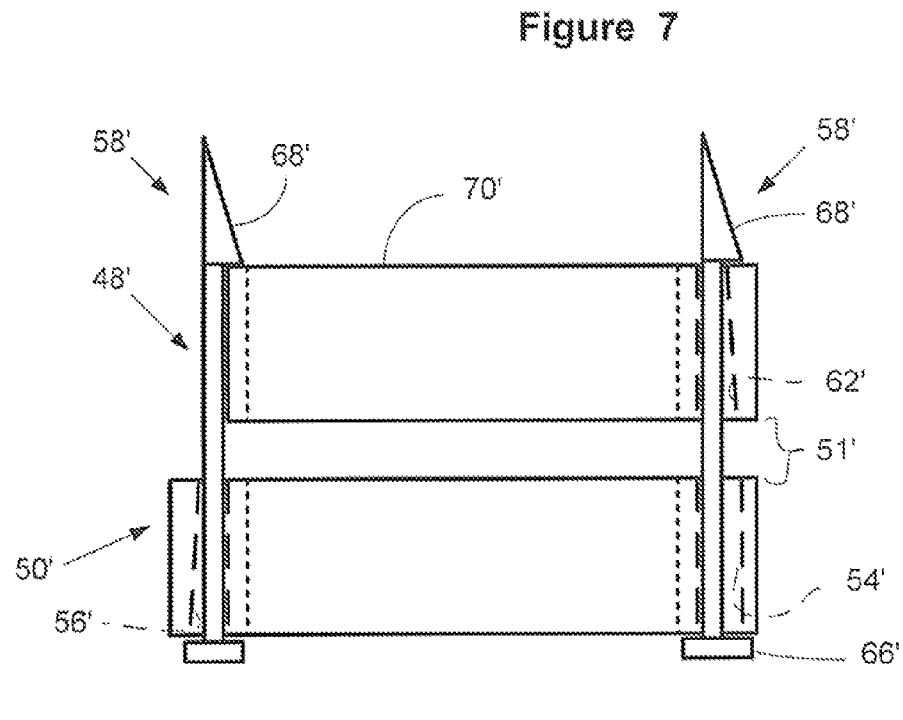
Figure 8
Figure 9

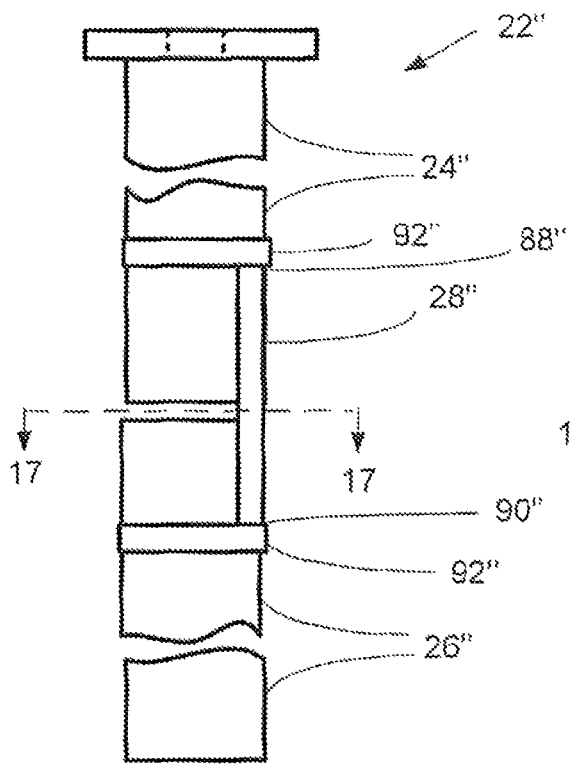
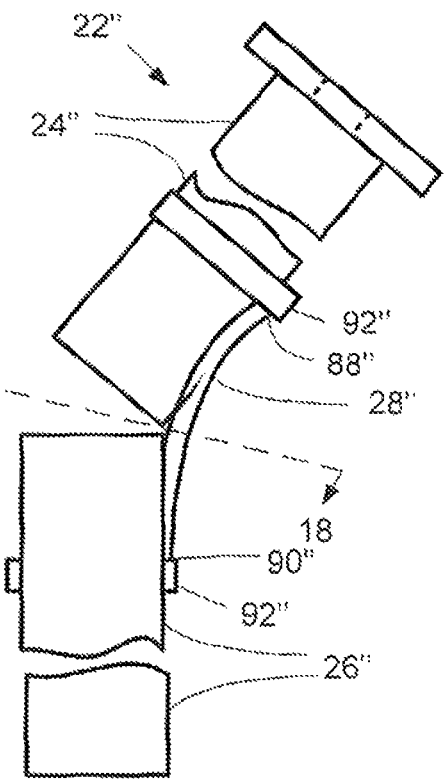
Figure 14
Figure 15
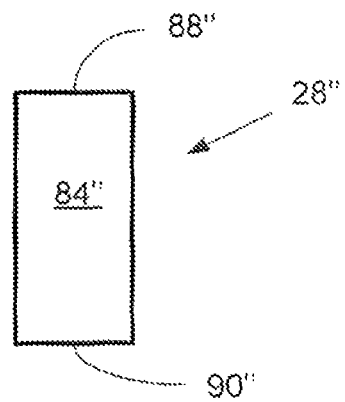
Figure 16
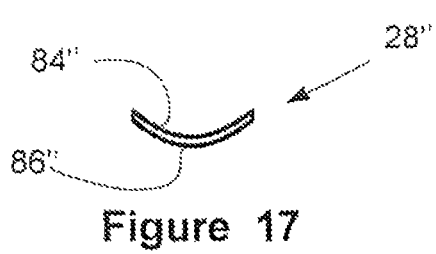
Figure 17
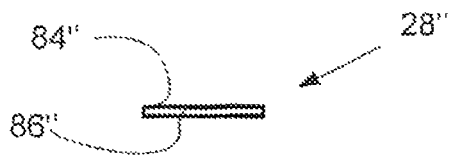
Figure 18

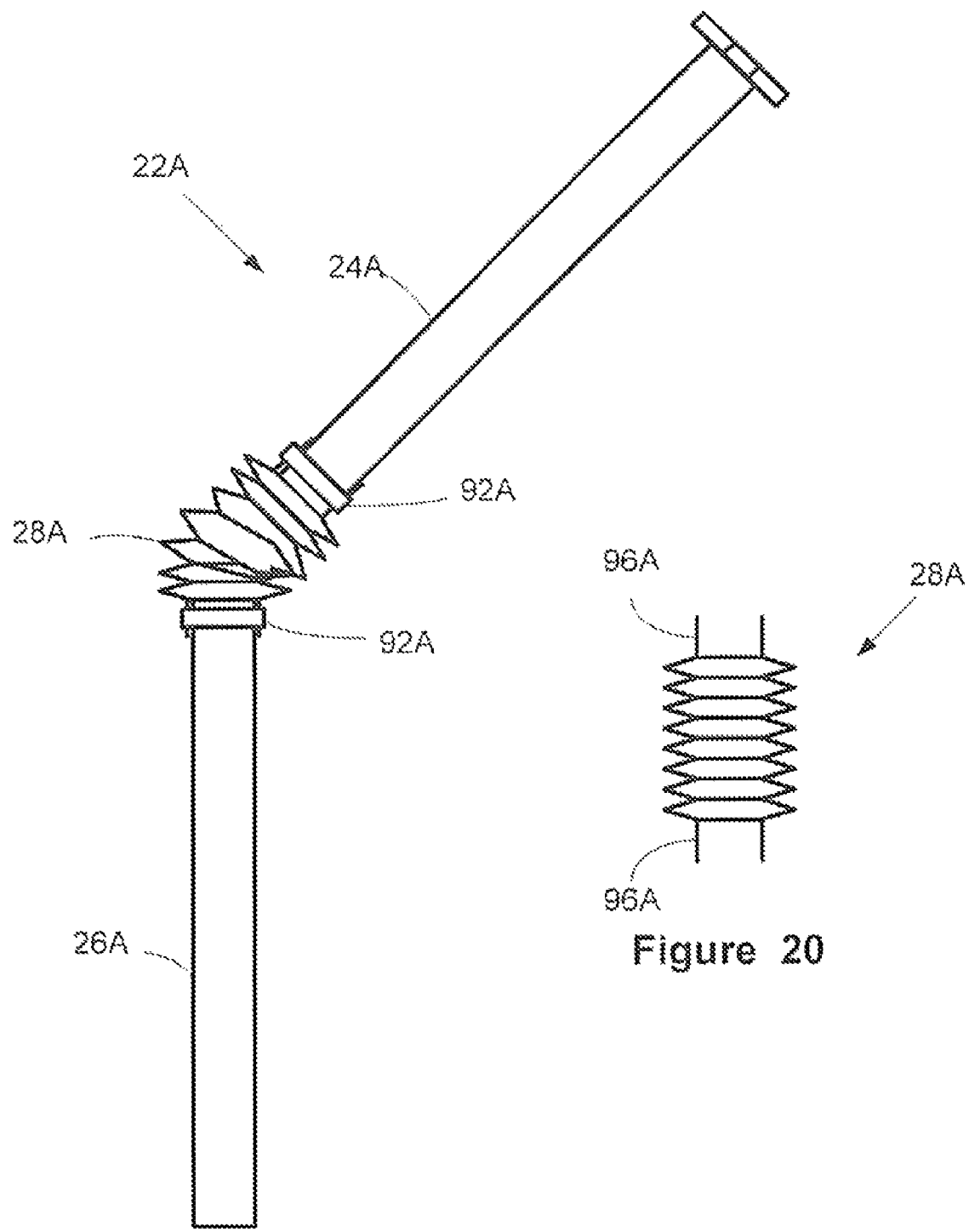

US 8,336,586 B2

LOADING SLEEVE AND METHOD FOR LOADING CHEMICAL REACTOR TUBES

This application claims priority from U.S. Provisional Application Ser. No. 61/096,097 filed Sep. 11, 2008, which is hereby incorporated herein by reference.

BACKGROUND

The present invention relates to a device and method for loading pellets, such as catalyst pellets, into chemical reactor tubes, and more specifically to a loading sleeve that can be used in low clearance areas of a chemical reactor, where the length of the sleeve is greater than the clearance above the upper tube sheet.

Many chemical reactions are carried out in a shell and tube heat exchanger having a large number of vertically oriented chemical reactor tubes which are welded or expanded onto a plurality of horizontal tube sheets. One tube sheet is generally located near the top of the reactor, with the reactor tubes extending downwardly from it. Additional tube sheets may be located near the bottom or middle of the tubes. The reactor tubes often are loaded with catalyst pellets, which assist in the chemical reaction. Other types of pellets may be loaded into the tubes as well, such as inert pellets. In order for the reactor to perform optimally, it usually is desirable to distribute the catalyst pellets evenly in the tubes.

It is desirable to load the pellets into the reactor tubes at a controlled rate to eliminate bridging and to ensure uniform packing of the pellets within the tubes of the reactor vessel. Ideally, this controlled rate is such that the number of pellets simultaneously passing through any point is fewer than the number of pellets required to form a bridge. The rate usually is controlled by controlling the size of the opening through which the pellets pass into the reactor tube.

Sometimes, long loading sleeves are used as loading aids so that, when the sleeve is filled and then is removed, the pellets settle to the desired height, leaving the desired empty space or outage between the top of the pellets and the top of the reactor tube. However, there may be height limitations within the reactor which prevent the use of long loading sleeves.

SUMMARY

The present invention provides loading sleeves which can be bent to allow their use even in those areas in a reactor where the clearance above the top tube sheet is less than the height of the loading sleeve.

BRIEF DESCRIPTION OF THE DRAWINGS

FIG. 7 is an exploded, side view of the hinge member of the loading sleeve of FIG. 6;

FIG. 8 is an assembled side view of the hinge portion shown in FIG. 7;

FIG. 9 is a side view of an alternate flexible element which may be used in the hinge members of FIGS. 7-8A;

FIG. 14 is a partially-broken away, side view of still another embodiment of a loading sleeve, using a flat spring, shown in the straight or aligned position;

FIG. 15 is a partially-broken away, side view of the loading sleeve of FIG. 14, but shown in the flexed position;

FIG. 16 is a front view of the flat spring of FIGS. 14 and 15;

FIG. 17 is a view along line 17-17 of FIG. 14;

FIG. 18 is a view along line 18-18 of FIG. 15;

FIG. 19 is a view of another embodiment of a loading sleeve shown in the flexed or unaligned position; and FIG. 20 is a view of the hinge portion of the sleeve of FIG. 19 in the straight or aligned position.

DESCRIPTION

Figure 1:
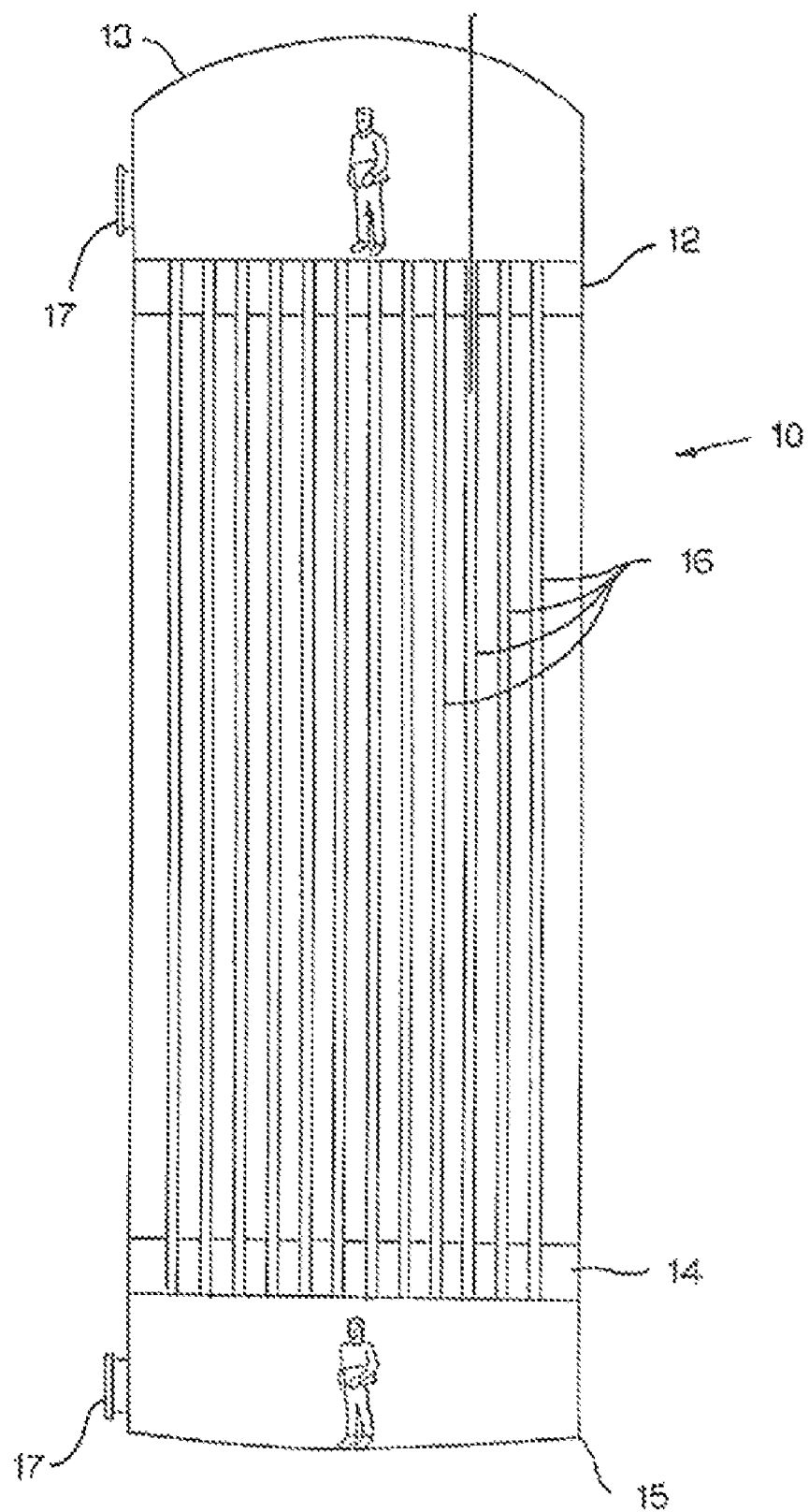
FIG. 1 is a schematic sectional view of a chemical reactor vessel including a shell and a plurality of vertical reactor tubes.

FIG. 1 shows a chemical reactor vessel 10, which is a shell and tube heat exchanger, having horizontal top and bottom tubesheets 12, 14 with many vertical reactor tubes 16 welded or expanded to the tubesheets 12, 14 in a triangular pitch arrangement, to form a tightly packed tube bundle. There may be many hundreds and even thousands of reactor tubes 16 extending between the tubesheets 12, 14. The vessel 10 includes a top dome (or top head) 13 and a bottom dome (or bottom head) 15, as well as manways 17 for access to the interior of the vessel 10. In this case, the reactor tubes 16 are filled with catalyst pellets (not shown), which assist with the chemical reaction. Reactors have either fixed or removable heads 13, 15. In this embodiment, the heads 13, 15 are fixed.

Figure 2:
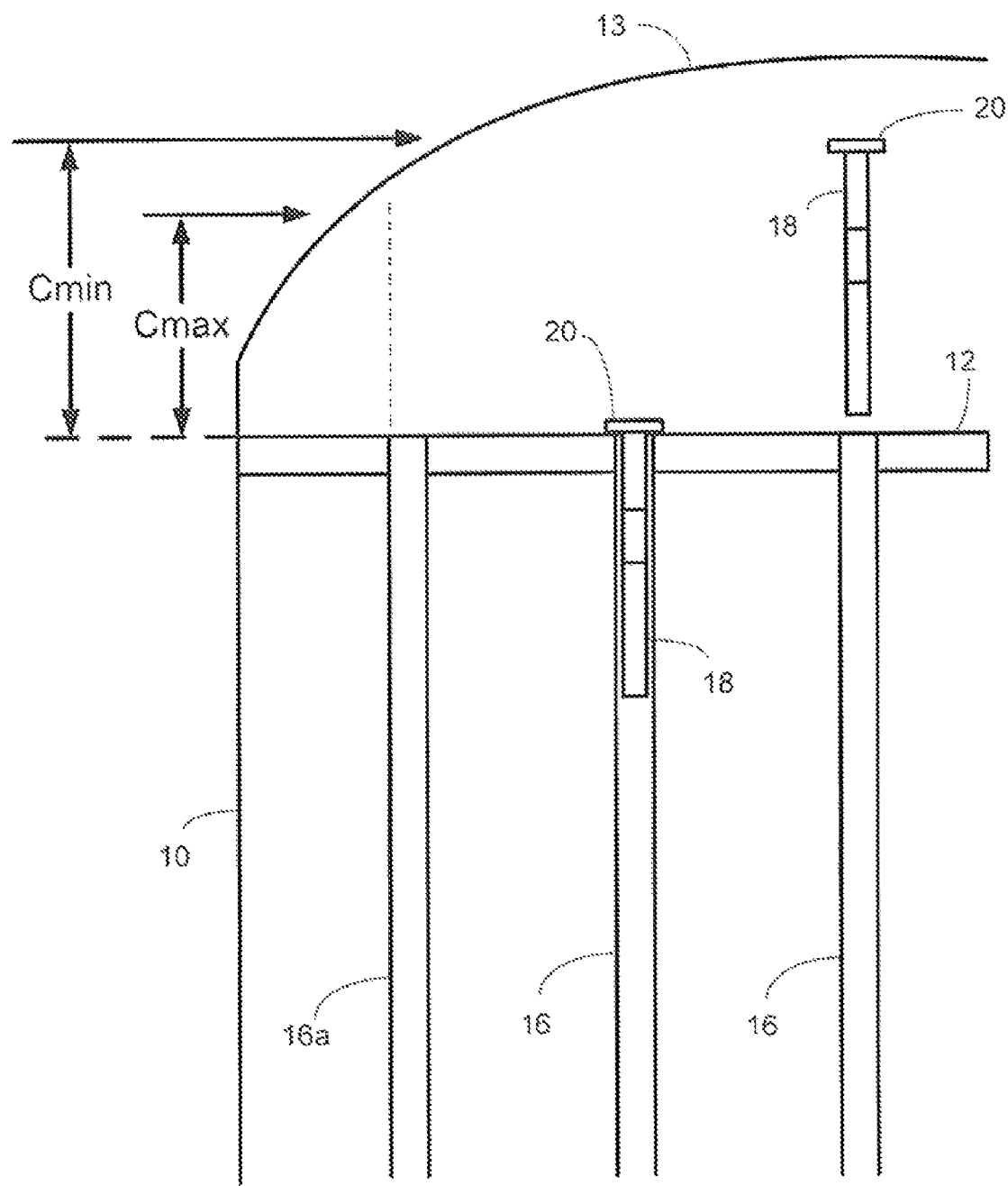
FIG. 2 is an enlarged schematic view of a portion of the reactor of FIG. 1 showing the difficulty of using a long loading sleeve in an area of the reactor with limited overhead clearance.
Figure 3:
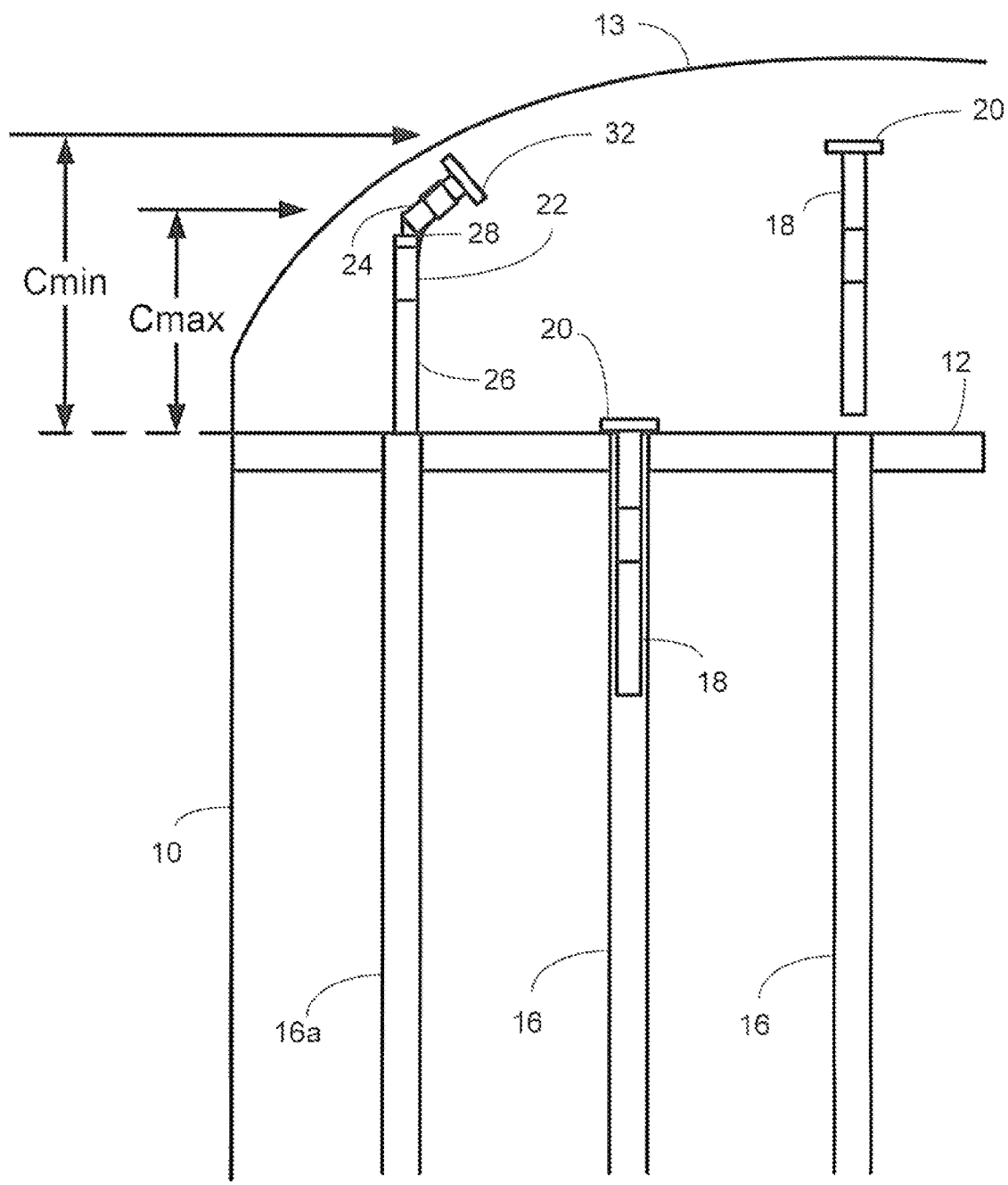
FIG. 3 is a schematic view, similar to that of FIG. 2, but showing the use of a loading sleeve in an area in which the clearance above the upper tube sheet is less than the length of the loading sleeve.

FIGS. 2 and 3 depict a portion of the chemical reactor 10 of FIG. 1, wherein the top dome 13 is very close to the upper tube sheet 12, especially at the outer edges of the tube sheet 12, resulting in very limited overhead clearance between the upper tube sheet 12 and the top dome 13.

A loading sleeve 18 for loading pellets has been inserted into the tube 16. The loading sleeve 18 includes an upper flange portion 20, which rests on the upper tube sheet 12 and is slightly larger in diameter than the inside diameter of the tube 16, so the loading sleeve 18 is suspended from the flange 20, which rests on the tube sheet 12. The flange 20 defines a small central opening (not shown) through which the pellets enter the sleeve 18, so that pellets entering through the central opening flow freely into the reactor tube 16.

Referring to FIG. 2, these loading sleeves 18, used as aids for loading pellets into reactor tubes 16, are straight, rigid, and require a minimum vertical clearance $C_{min}$ (slightly greater than the length of the sleeve 18) above the upper tube sheet 12 in order to be aligned with a reactor tube 16 and inserted into the tube 16 and then to be removed from, the tube 16. However, for certain tubes 16 of the reactor 10, especially those tubes $16_a$ located near the outer edges of the tube sheet 12, the maximum overhead clearance $C_{max}$ available is less than the minimum vertical clearance $C_{min}$ that is required for the installation and removal of these straight loading sleeves 18.

Figure 4:
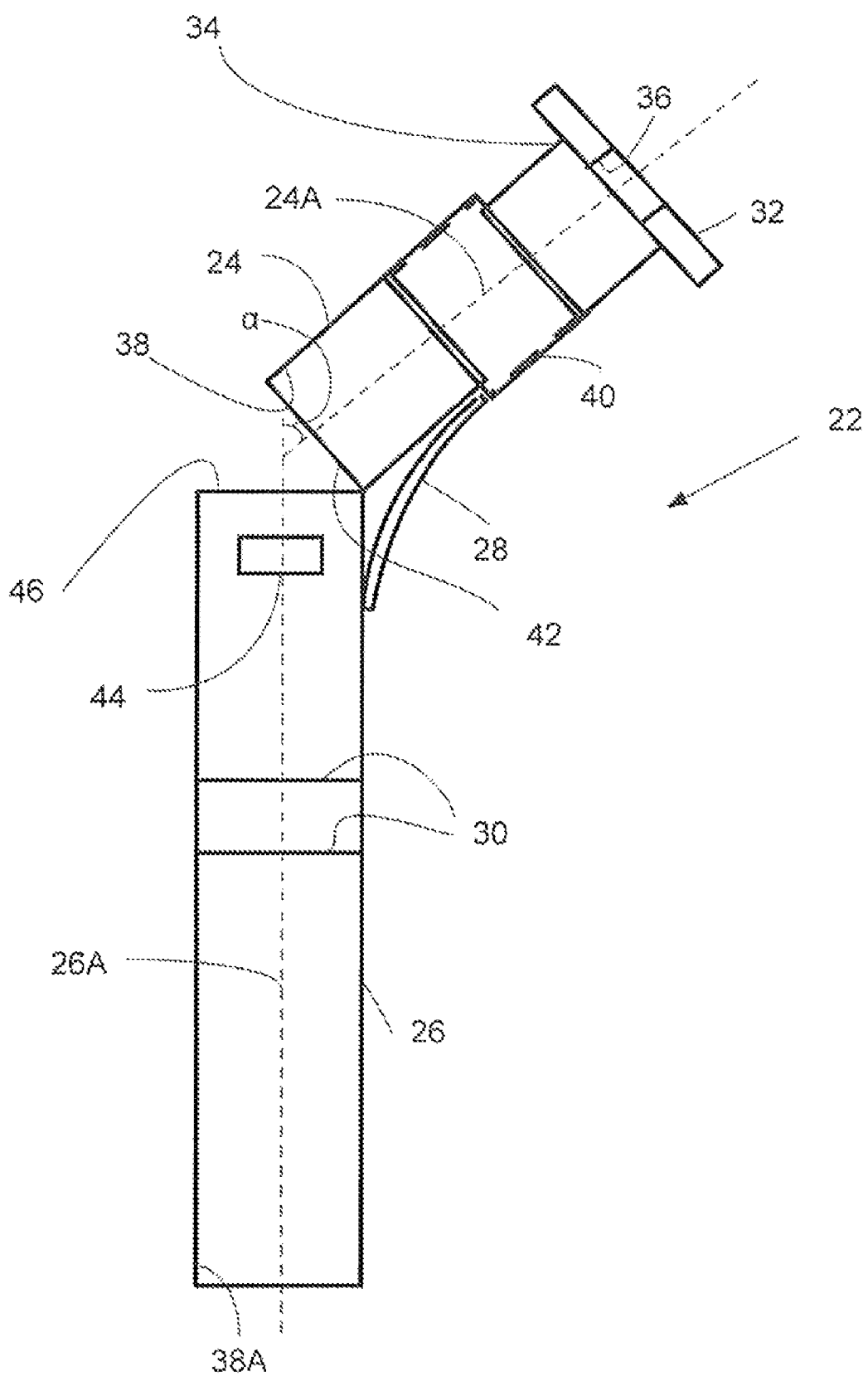
FIG. 4 is a side view of the loading sleeve of FIG. 3, shown in the unaligned or flexed position.
Figure 5:
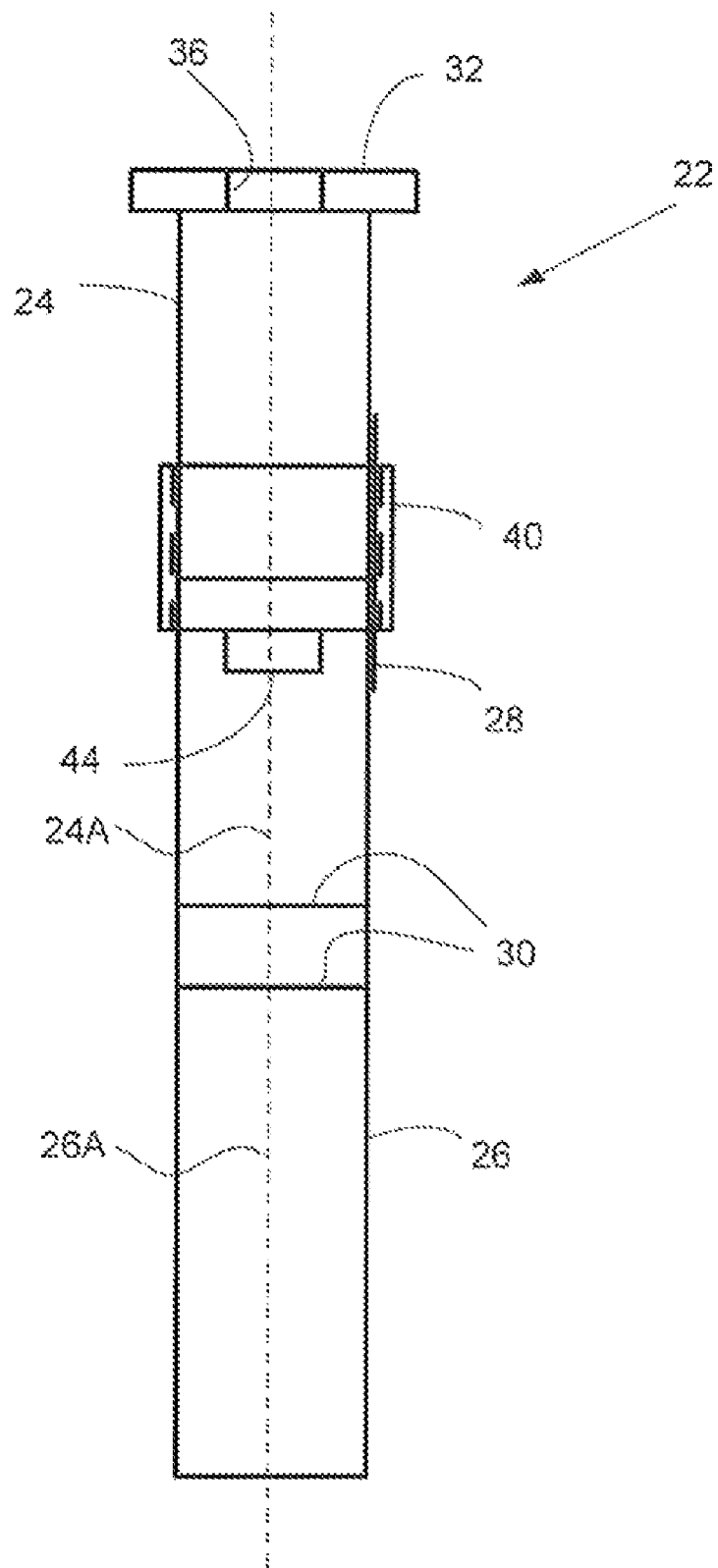
FIG. 5 is a side view of the loading sleeve of FIG. 4, but shown in the aligned or straight position.

FIGS. 3-5 depict an example of a loading sleeve 22, which can be used in these areas, in which the clearance above the top tube sheet 12 is not sufficient for use of a standard, rigid sleeve. Referring briefly to FIG. 4, the articulating loading sleeve 22 includes upper and lower rigid tubular sleeve portions 24, 26, which, in this case, are substantially rigid, hollow, cylindrical elements. The upper and lower rigid tubular sleeve portions 24, 26 in this embodiment are made of PVC pipe and both sleeve portions 24, 26 have the same inside diameters and the same outside diameters. The upper and lower rigid tubular sleeve portions 24, 26 are interconnected by a hinge member 28, which in this case is a flexible strap or tape, which is substantially more flexible than the rigid sleeve portions 24, 26 and is secured to the upper and lower sleeve portions 24, 26, providing a means for holding the sleeve portions together in both an aligned position and an unaligned position. In this embodiment, the flexible strap is secured by means of an adhesive, but other securing means, such as riveting, could be used instead. The lower sleeve portion 26 includes sleeve markings 30 which may be used to check for the proper outage level inside the tubes 16, 16A after the particles are loaded into the reactor tube by partially reinserting the loading sleeve until it contacts the top of the column of particles in the reactor tube. (The outage level is the open space between the top of the column of particles and the top of the reactor tube.)

In this particular embodiment, the upper and lower tubular sleeve portions 24, 26 are made of two identical pieces of PVC pipe except that the upper sleeve portion 24 is shorter than the lower sleeve portion 26. The upper sleeve portion 24 defines a first longitudinal axis 24A, and the lower sleeve portion 26 defines a second longitudinal axis 26A. As shown in FIG. 4, the upper and lower tubular sleeve portions 24, 26 are in an unaligned position, in which the longitudinal axes 24A, 26A are at a substantial angle to each other. The hinge arrangement permits the upper and lower tubular sleeve portions 24, 26 to bend about the hinge member 28 to provide an angle α between the longitudinal axes. The angle α should be sufficient to permit the sleeve to fit within the clearance above the tube sheet. The angle α preferably is at least 20 degrees, and more preferably at least 45 degrees.

The upper sleeve portion 24 has a top and a bottom and includes a flange 32 at its top end 34. The flange 32 defines a central opening 36 in fluid communication with the substantially cylindrical, internal passageway 38 of the upper sleeve portion 24. The opening 36 is larger than the smallest dimension of the pellets to be loaded into the tube 16A. The central opening 36 also has a smaller diameter than the rest of the passageway 38, 38A below it, and smaller than the inside diameter of the reactor tube 16A, so that pellets entering through the central opening 36 flow freely through the loading device 22 and into the reactor tube 16A.

The upper sleeve portion 24 also includes an alignment ferrule 40 which in this particular embodiment is just a larger diameter piece of PVC pipe, being cylindrical and having an inside diameter which is slightly larger than the outside diameter of the upper and lower sleeve portions 24, 26, such that the alignment ferrule 40 slides freely longitudinally along the upper and lower sleeve portions 24, 26 between the flange 32 on the upper sleeve portion 24 and the stop 44 on the lower sleeve portion 26.

The stop 44 is an outward projection from the cylindrical pipe on the lower sleeve portion 26 and is located a short longitudinal distance from the top end 46 of the lower sleeve portion 26. When the upper and lower sleeve portions 24, 26 are longitudinally aligned, with the longitudinal axes 24A, 26A being colinear and the bottom edge 42 of the upper sleeve portion 24 abutting the top edge 46 of the lower sleeve portion 26, as shown in FIG. 5, the alignment ferrule 40 can be slid downwardly so it overlaps both the lower end 42 of the upper sleeve portion 24 and the upper end 46 of the lower sleeve portion 26, with the stop 44 abutting the bottom of the alignment ferrule 40 to ensure that the alignment ferrule 40 is in the proper position to overlap the joint between the upper and lower sleeve portions 24, 26 in order to lock the loading sleeve 22 in the aligned position.

When the alignment ferrule 40 is overlapping the joint between the upper and lower sleeve portions 24, 26, as shown in FIG. 5, it ensures that the upper and lower sleeve portions 24, 26 remain in alignment with each other, and it prevents the upper and lower sleeve portions 24, 26 from bending relative to each other about the hinge member 28, so the loading sleeve 22 behaves as a straight, rigid loading sleeve, similar to the loading sleeves 18 described earlier. However, if the alignment ferrule 40 is slid upwardly along the upper sleeve portion 24 until it clears the top 46 of the lower sleeve portion 26, then the upper sleeve portion 24 may be bent relative to the lower sleeve portion 26 by flexing the hinge member 28, as shown in FIGS. 3 and 4. This allows the loading sleeve 22 to be inserted into the reactor tube 16A as shown in FIG. 3.

To use the loading sleeve 22, the alignment ferrule 40 is slid up longitudinally along the upper sleeve portion 24 until it clears the top 46 of the lower sleeve portion 26. Then the loading sleeve 22 is bent about the hinge member 28 to an unaligned position, as shown in FIG. 3, so it has an effective length that is short enough to permit it to fit within the clearance above the tube sheet 12 in order to insert the lower sleeve portion 26 into the reactor tube 16a. Then the lower sleeve portion 26 is inserted into the reactor tube 16a until the loading sleeve 22 can be straightened out, bending the upper sleeve portion 24 relative to the lower sleeve portion 26 about the hinge member 28, and then continuing to insert the loading sleeve 22 into the reactor tube 16a until the flange 32 rests on the upper tube sheet 12. Once the sleeve 22 is in the aligned or straight position, the alignment ferrule 40 is allowed to drop down until it hits the stop projection 44 on the lower sleeve portion 26, locking the sleeve 22 in the aligned position. Many of these loading sleeves are inserted into respective reactor tubes in a similar manner. Then particles are brushed over the top of the tube sheet 12, falling through the openings 36 in the flanges 32 and through the upper and lower tubular sleeve portions 24, 26 into their respective reactor tubes. The particles continue to be brushed into the loading sleeves until they fill the loading sleeves 22. Then, the loading sleeves 22 are removed by pulling them part-way out of the reactor tubes 16a, lifting their alignment ferrules 40, bending the upper sleeve portions 24 relative to their respective lower sleeve portions 26 about their respective hinge members 28, and then pulling the sleeves 22 the rest of the way out of their reactor tubes 16a, allowing the particles within the loading sleeves 22 to settle to the desired height within the reactor tubes 16a, in order to provide the desired outage or spacing between the top of the particles and the top of the reactor tube.

The operator may then straighten the sleeve 22 and slide the alignment ferrule 40 downwardly until it contacts the stop 44, again locking the sleeve 22 in the aligned position and making the sleeve 22 easier to handle as it is carried to another reactor tube or is carried out of the reactor.

The strap of the hinge member 28 extends over only a few degrees of the entire circumference of the sleeve portions 24, 26, so it does not interfere with the ability of the upper sleeve portion 24 to flex relative to the lower sleeve portion 26. It is preferred that the strap or tape extend over less than 30 degrees of the circumference of the sleeve portions 24, 26 and most preferable that it extend over less than 15 degrees.

While a flexible strap type of hinge member 28 is shown in this embodiment, there are other ways that rigid upper and lower sections of a sleeve may be connected by a more flexible hinge member to enable a long, rigid sleeve that is longer than the clearance above a reactor tube to be inserted and removed from that reactor tube. For example, a live hinge that is formed as an integral part of the upper and lower sections may be used. A live hinge is a thin section of flexible material, such as plastic, that connects two segments (in this instance the two sleeve portions 24, 26) and can be flexed, so it provides means for holding the upper and lower tubular sleeve portions 24, 26 together in an aligned position and in an unaligned position. Alternatively, other known types of hinges, such as a piano hinge or other hinge using a hinge pin could be used.

It should also be noted that the alignment ferrule 40 is trapped between the flange 32 and the stop 44, each of which has an outside diameter larger than the inside diameter of the alignment ferrule 40, which prevents the alignment ferrule 40 from falling off of the sleeve during use.

While cylindrical upper and lower sleeve portions 24 26 are preferred, having circular cross-sections, other cross-sectional shapes could be used, and the cross-sectional shapes of the upper and lower sleeve portions do not have to be identical to each other.

ADDITIONAL EMBODIMENTS

Figure 6:
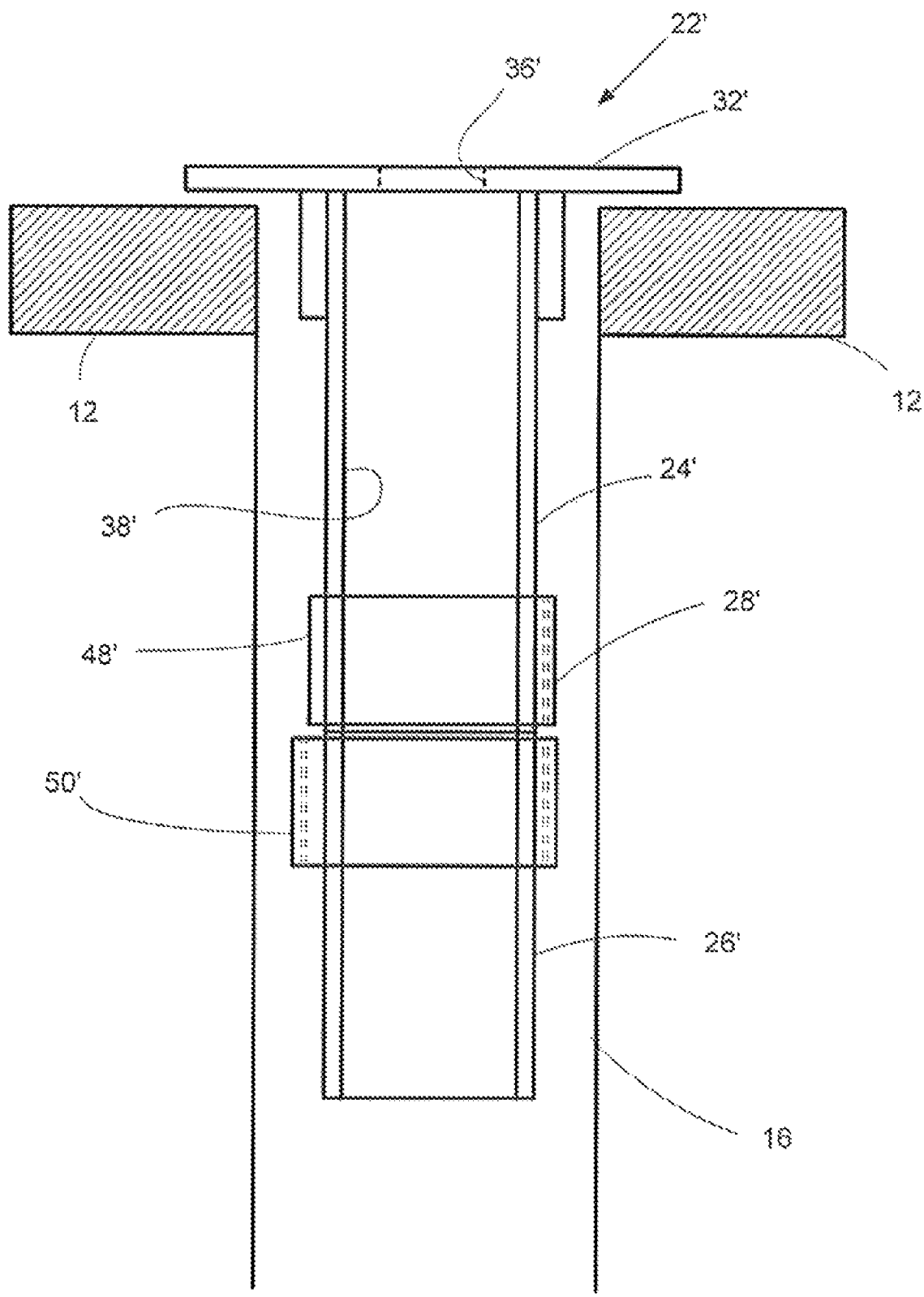
FIG. 6 is a cross-sectional view showing another embodiment of a loading sleeve installed in a reactor tube.

FIGS. 6-10 depict another embodiment of a loading sleeve 22'. Referring briefly to FIG. 6, the loading sleeve 22' is depicted inserted in a reactor tube 16, with its flange 32' resting on the upper tube sheet 12, and defining a central opening 36' which has a smaller diameter than the rest of the passageway 38' below it, as well as being smaller than the inside diameter of the reactor tube 16, so that pellets entering through the central opening 36' flow freely through the loading sleeve 22' and into the reactor tube 16. As with the previous embodiment, the upper and lower rigid tubular sleeve portions 24' 26' are identical pieces of PVC pipe. Upper and lower rings 48', 50' are secured to the upper and lower sleeve portions 24', 26' respectively, as shown in FIG. 6, to form a hinge member 28' as explained in more detail below.

FIG. 7 depicts the upper and lower rings 48', 50' in more detail. In this embodiment, the rings 48', 50' are short pieces of PVC pipe which are glued to the upper and lower sleeve portions 24', 26' of the loading sleeve 22', respectively. The lower ring 50' has an inner surface 52' (See FIG. 7) which very closely matches the outside surface of the lower sleeve portion 26', so the two surfaces are in close engagement, and it defines first and second radially-opposed, longitudinally-extending through-openings 54', 56'. The second opening 56' is slightly tapered (See FIG. 7) to help ensure that the flexible element 58' is not readily pulled out as explained in more detail below. The upper ring 48' also has an inner surface 60' which very closely matches the outside surface of the upper sleeve portion 24', and it defines a single, longitudinally-extending through-opening 62' which also is slightly tapered to help ensure that the flexible element 58' is not readily pulled out.

Figure 8A:
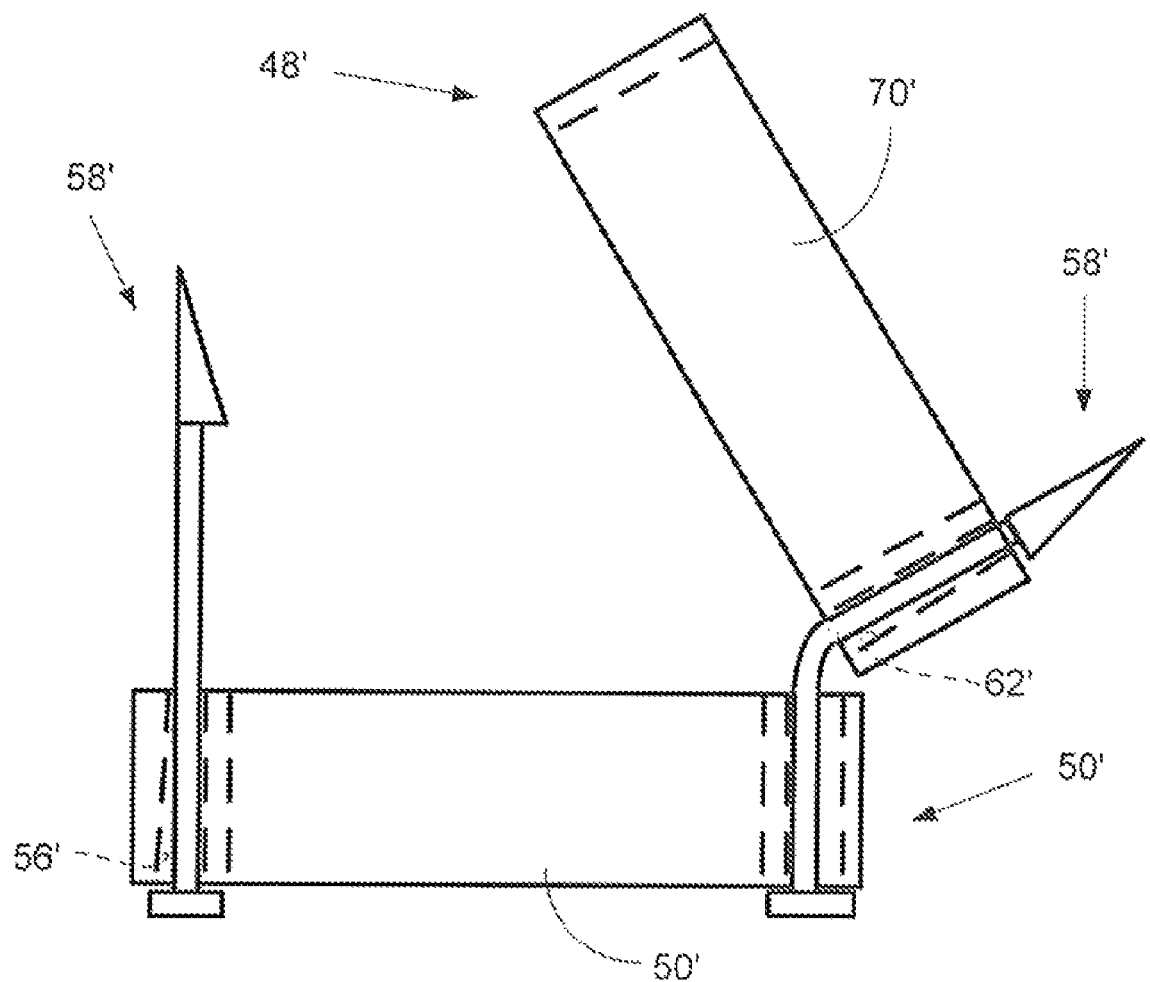
FIG. 8A is identical to FIG. 8, but showing the hinge in the flexed or unaligned position.

The flexible element 58' includes a substantially cylindrical shaft portion 64' with a flat head portion 66' at its first end and a wedge-shaped tail portion 68' at its second end. The flexible element 58' preferably is made from a flexible material, such as nylon. The length of the shaft portion 64' is substantially equal to the height of the two rings 48', 50' stacked on top of each other, with only a short gap 51' (See FIG. 8) between them. The gap 51' provides room to allow the hinge member 28' to flex to the unaligned position as shown in FIG. 8A. The tops of the openings 62' and 56' have a smaller diameter than the bottom of the wedge-shaped tail 68' when the tail is in the "at rest" shape, and the bottom of the opening 54' has a smaller diameter than the head 66'.

To assemble the hinge member 28' onto the articulating loading sleeve 22', the upper ring 48' is secured, as by gluing, to the bottom end of the upper sleeve portion 24'. Similarly, the lower ring 50' is secured, as by gluing, to the top end of the lower sleeve portion 26'. The upper and lower sleeve portions 24', 26' are then rotated such that the through opening 54' of the lower ring 50' is aligned with the through opening 62' of the upper ring 48', and then the wedge-shaped tail portion 68' of the flexible element 58' is pushed upwardly through these aligned through openings 54', 62' to the position shown in FIG. 8. The tapered opening 62' in the upper ring 48' gradually deforms the wedge-shaped tail portion 68' as the tail portion 68' moves upwardly, and then, once it passes through the opening 62', the tail portion 68' returns to its original "at rest" shape, thereby preventing the flexible element 58' from falling out once it has been pushed through the openings 54', 62'.

As shown on the left side of FIG. 8, a second flexible element 58' may be installed through the second opening 56' of the lower ring 50'. This second flexible element 58' acts as a latch pin to hold the upper and lower sleeve portions 24', 26' in straight alignment when so desired. To flex the articulating loading sleeve 22' the user grasps the tail portion 68' of the latch pin 58' and shifts it outwardly, off of the top shoulder 70' of the upper ring 48'. Then the upper tubular sleeve portion 24' of the loading sleeve 22' can be bent relative to the lower tubular sleeve portion 26' by flexing the first flexible element 58' as shown in FIG. 8A.

FIG. 9 depicts an alternate embodiment of a flexible element 59' which is identical to the previous flexible element 58' except that the flat head 66' has been replaced by a second wedge-shaped tail 67'. This permits the flexible element 59' to be inserted in either direction. If this flexible element 59' is used, the through opening 54' in the lower ring 48' could be modified to make it a tapered opening (narrower at the bottom than at the top), if desired.

Figure 10:
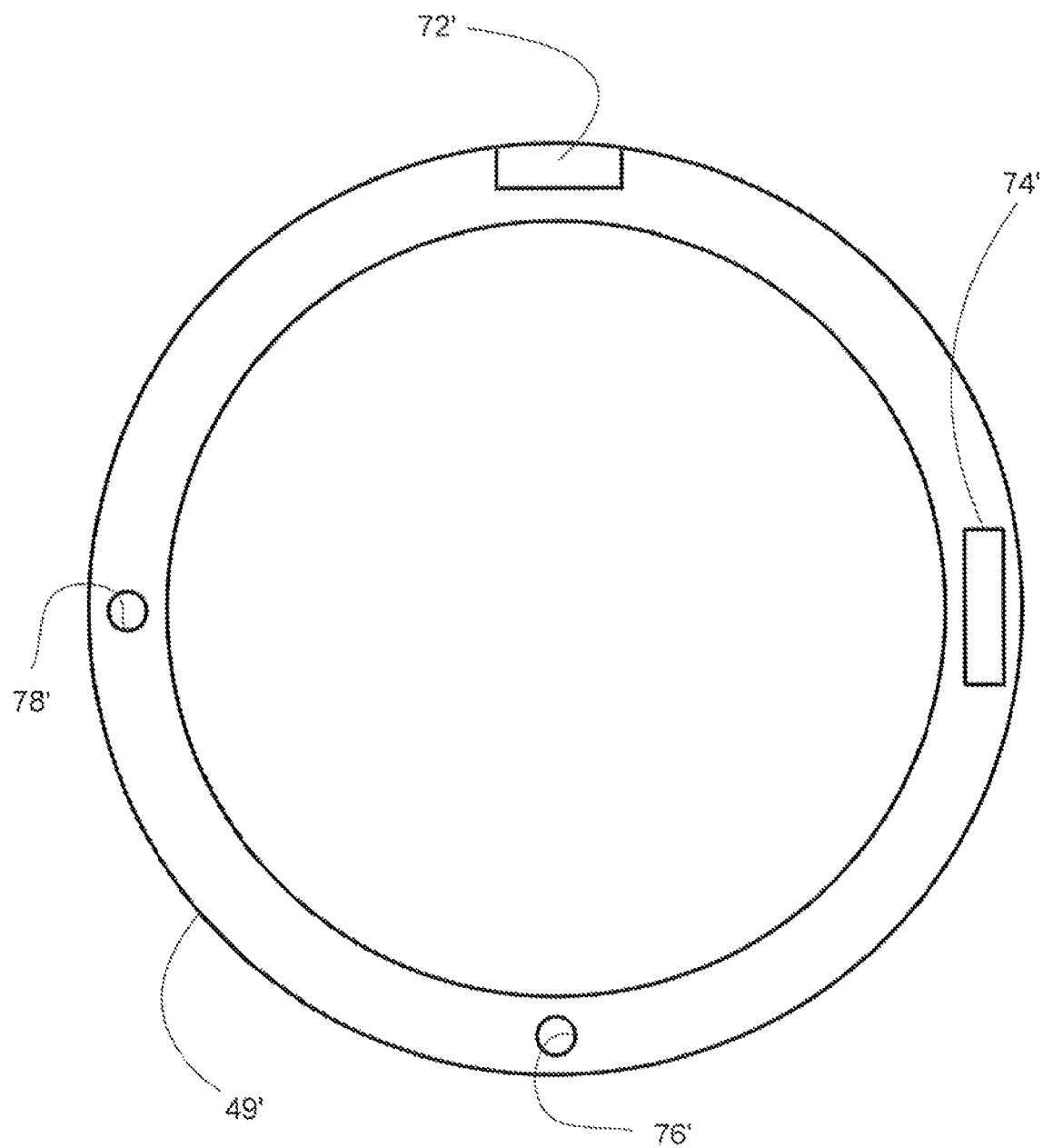
FIG. 10 is a top view of an alternate top ring which could replace the top ring of the hinge member of FIG. 6.
Figure 10A:
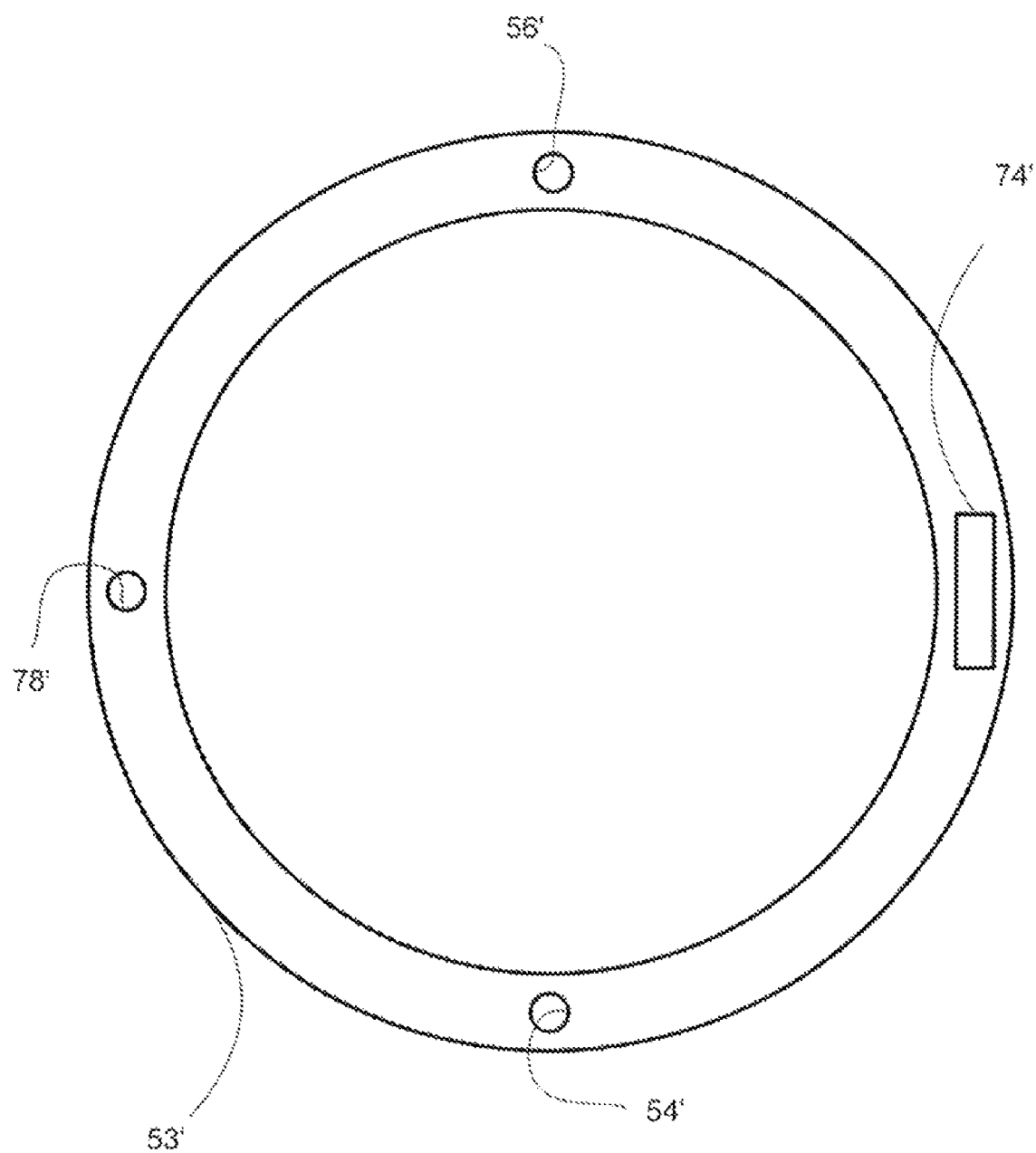
FIG. 10A is a bottom view of an alternate bottom ring which could replace the bottom ring of the hinge member of FIG. 6.

FIG. 10 is a top view of an alternative ring 49', which could be used instead of the ring 48' of FIG. 6, and FIG. 10A is a bottom view of an alternative ring 53', which may be used instead of the ring 50' of FIG. 6. The top ring 49' includes a flat, slightly recessed land 72' (at the 12:00 o'clock position) for engaging the tail portion 68' of a latch 58' (as shown in the left-hand portion of FIG. 8), and the bottom ring 53' has a tapered hole 56' in the corresponding position, also as shown in the left-hand portion of FIG. 8.

The top ring 49' also includes a slotted opening 74' (at the 3:00 o'clock position) to receive a flexible strap or tape which may be used as a flexible member for the hinge member. The bottom ring 53' has a similar slotted opening 74' at the same position. The flexible strap or tape may be, for example, a piece of nylon strapping or tape, which extends through the two aligned slotted openings 74' in the top and bottom rings, and it may be secured in place by being formed into a continuous loop, such as by stapling the ends together, or by enlarging the ends so they will not pull back through the slotted openings 74'.

At the 6:00 o'clock position, the upper ring 49' defines a through opening 76' to receive a flexible element 58' as shown on the right-hand portion of FIG. 8), and the bottom ring 53' has an opening 54' corresponding to the bottom opening on the right-hand portion of FIG. 8. It should be noted that, instead of receiving the hinge element 58', these aligned openings 76', 54' could receive a cord that is formed into a loop as described above with respect to the strapping, or they could receive some other flexible connector.

Finally, at the 9:00 o'clock position the top ring 49' defines another through opening 78' which is the same as the opening 76' and may be used as described with respect to that opening. It is possible to have more than one flexible element, if desired. For instance, through openings such as the opening 76' may be placed at the 6:00 o'clock position and at the 8:00 o'clock position (not shown), and flexible elements 58' may be installed at both of these positions to achieve a more positive self-alignment of the upper and lower sleeve portions 24', 26' when the loading sleeve 22' is in the aligned position.

Even though the ring 49' is depicted in FIG. 10 as surrounding the entire circumference of the upper sleeve portion 24', the ring may encompass only a portion of the circumference. For instance, the ring actually may be "C" shaped to enclose only half of the circumference of its corresponding sleeve portion. In another embodiment, the ring may include one or more short-arc-length shoulders, each one encompassing only 5 to 10 arc degrees, just wide enough to anchor its hinge element or latch element to its corresponding sleeve portion. Alternatively, the ring could be molded into the sleeve portion itself.

Figures 11, 12:
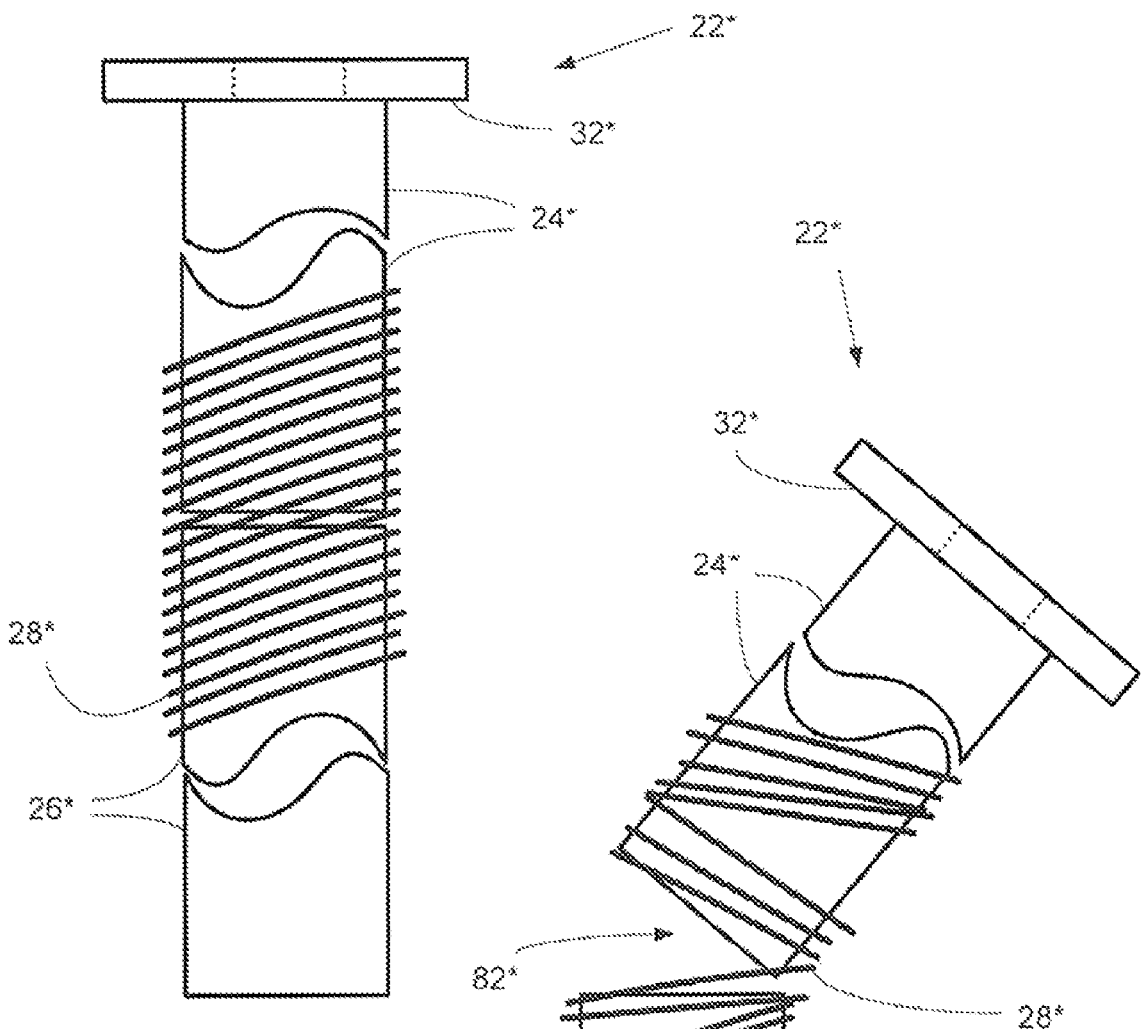
FIG. 11 is a partially-broken away, side view of another embodiment of a loading sleeve, shown in the straight or aligned position.
FIG. 12 is a partially-broken away, side view of the loading sleeve of FIG. 11, but shown in the flexed or unaligned position.

FIGS. 11 and 12 depict another embodiment of a loading sleeve 22* including a flange 32*. In this embodiment, the hinge member 28* is a spiral wound coil spring, similar to a return spring on a screen door. The spring 28* is formed with an upper portion having an "at rest" inside diameter that is slightly smaller than the outside diameter of the rigid upper sleeve portion 24* and a lower portion having an "at rest" inside diameter that is slightly smaller than the outside diameter of the rigid lower sleeve portion 26*, which allows the spring 28* to firmly grip the upper and lower rigid sleeve portions 24*, 26*. In one embodiment, the "at rest" inside diameter of the spring 28* is 5% smaller than the outside diameter of the corresponding sleeve portions 24*, 26*. It is preferred that the "at rest" inside diameter of the spring portion be 90%-97% of the outside diameter of the corresponding sleeve portion 24*, 26* (or 3%-10% less than the outside diameter of the sleeve portions). The "at rest" diameter is the diameter that is measured when the spring is in an unstressed condition, with no outside forces acting on it.

To assemble the articulating loading sleeve 22*, the coils of the spring 28* are unwound slightly to make their inside diameters large enough to slide them over the ends of the upper and lower sleeve portions 24*, 26* until the ends of the upper and lower sleeve portions 24*, 26* are nearly abutting each other, as shown in FIG. 11. Once the spring 28* is released, its coils snap back, collapsing around the outer surfaces of the upper and lower sleeve portions 24*, 26* and locking onto them such that the upper and lower sleeve portions 24*, 26* do not slide axially along the spring 28*.

The spring force of the spring 28* causes it to tend to return to its straight configuration shown in FIG. 11, lining up the ends of the upper and lower sleeve portions 24*, 26* to make a straight loading sleeve 22* in the aligned position (as shown in FIG. 11). However, the spring 28* may be flexed to form an angular gap 82*, as shown in FIG. 12, such that the spring 28* acts as a hinge member to allow the upper and lower portions 24*, 26* to bend relative to each other about the spring 28* to move to an unaligned position.

Figure 13:
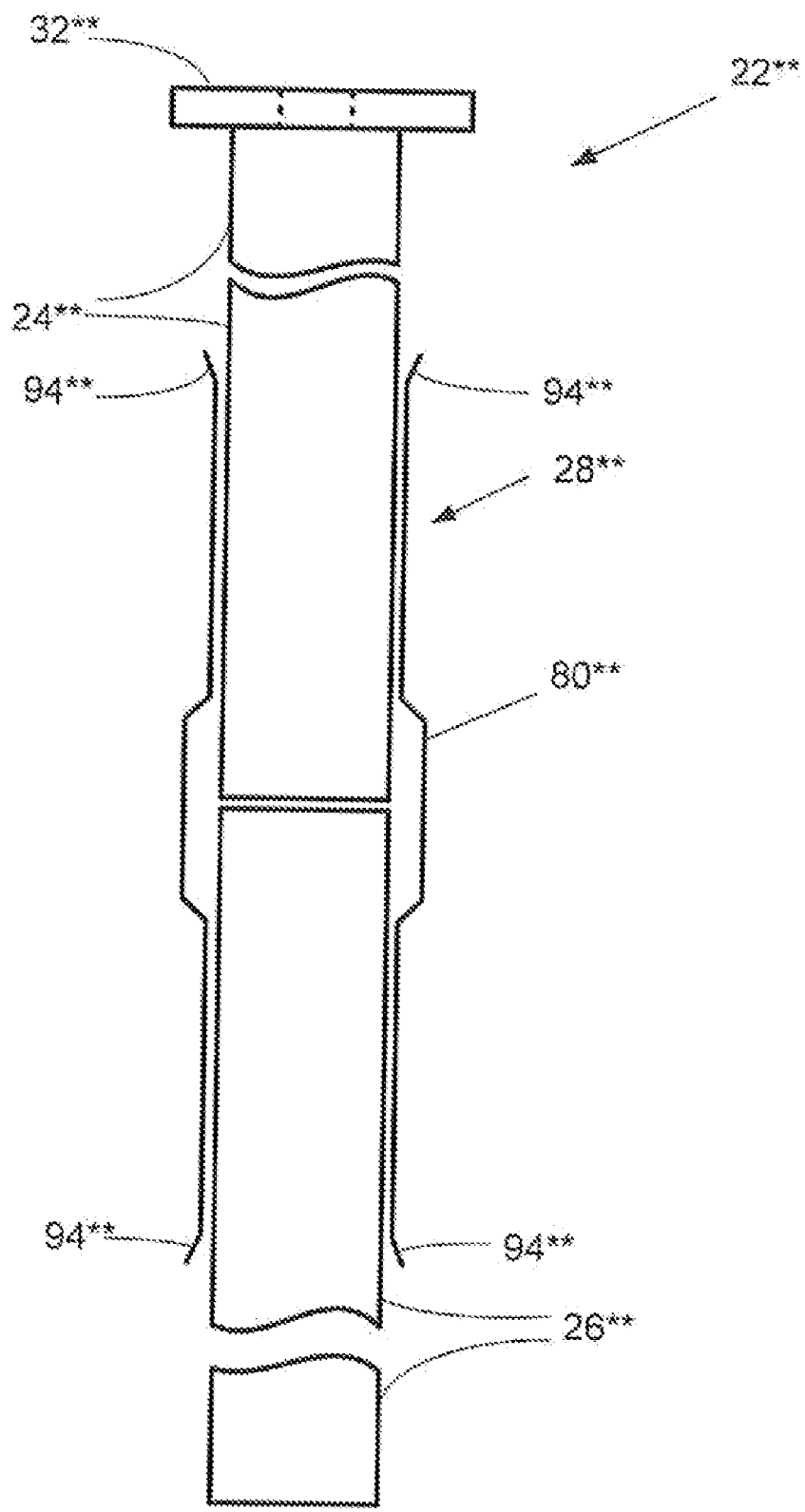
FIG. 13 is a partially-broken away, schematic side view of another embodiment of a loading sleeve.

FIG. 13 schematically depicts another embodiment of a loading sleeve 22 having a flange 32** and using a coil spring. This embodiment is practically identical to the loading sleeve 22* described above, except that the spring 28** is specially wound so that it has a slight bulge 80** in the central area where the upper and lower sleeve portions 24**, 26** come together. This bulge 80** represents the fact that the spring has been wound with a slightly larger "at rest" inside diameter in its central portion and a smaller "at rest" inside diameter above and below the central portion. The larger diameter central portion extends for a height which is about 1-2 times the outside diameter of the rigid sleeve portions 24**, 26**. For example, if the outside diameter of the sleeve portions is one inch, the height of the bulge 80** is about 1-2 inches. The inside diameter of the bulged portion 80** is 2% larger than the inside diameter of the ends of the spring in this particular embodiment. It is preferred that the bulge portion of the spring have an "at rest" inside diameter that is 1%-8% greater than the "at rest" inside diameter of the upper and lower ends of the spring. The bulge helps prevent the spring from getting into the gap and interfering with the sleeve's returning to its straight position 13**.

The spring 28 also includes an enlarged inside diameter flare 94** at each end, which eases the insertion of the upper and lower sleeve portions 24**, 26** into the spring 28** and prevents the spring 28** from gouging the sleeve portions 24**, 26** as they are inserted into the spring 28****.

FIGS. 14 and 15 depict yet another embodiment of a loading sleeve 22". In this embodiment, the hinge member 28" includes a flat spring, which is substantially flat and is made of a short piece of spring steel similar to what is found in a tape measure.

Referring to FIGS. 16-18, it can be seen that the flat spring has an arcuate cross-sectional shape, with a concave inner surface 84" and a convex outer surface 86" (See FIG. 17), conforming relatively closely to the curvature of the upper and lower rigid sleeve portions 24", 26". The height of the flat spring is preferably from one to four times the outside diameter of the upper and lower sleeve portions 24", 26". When the loading sleeve 22" is in its straight, aligned position, as depicted in FIG. 14, the flat spring is in its relaxed condition, exhibiting the concave/convex profile shown in FIG. 17 along its entire length.

The top end 88" of the flat spring is secured to the upper sleeve portion 24", and the bottom end 90" of the flat spring is secured to the lower sleeve portion 26" as depicted in FIG. 14, with the concave surface 84" of the flat spring lying against the outer surfaces of the upper and lower sleeve portions 24", 26". The flat spring of the hinge member 28" may be secured to the upper and lower sleeve portions 24", 26" via compression or clamping rings 92", tape, rivets, adhesive, or other known securing means.

FIG. 15 shows the loading sleeve 22" in the flexed or unaligned position, with the flexible element of the hinge member 28" bending back such that its profile, at the point where it is bent, is flat, as shown in FIG. 18. In this "strained" condition, the spring steel folds readily to act as a hinge. However, the spring force causes the spring to be biased toward returning to its original position, and, as soon as the loading sleeve 22" is back to its straight configuration with the upper and lower rigid sleeve portions 24", 26" aligned, the flexible spring of the hinge member 28" returns to its original, relaxed condition, exhibiting the concave/convex profile shown in FIG. 17, which resists flexing.

FIGS. 19 and 20 depict another embodiment of a loading sleeve 22A. This embodiment is similar to the loading sleeve 22 described above, with the main difference being that the coil spring hinge member 28 has been replaced by a bellows 28A in the area where the upper and lower rigid sleeve portions 24A, 26A meet. The bellows 28A acts as a type of live hinge member, similar to that found in a bendable straw (also known as a "bendy" straw) which has a concertina-type hinge to allow the straw to flex.

Referring briefly to FIG. 20, the bellows 28A includes upper and lower tubular projections 96A which have an inside diameter that is slightly larger than the outside diameter of the upper and lower rigid sleeve portions 24A, 26A. These projections 96A are slid over the respective ends of the respective sleeve portions and are secured to the respective sleeve portions by means of compression rings or clamps 92A as shown in FIG. 19 (or by tape, adhesive, or other means).

It will be obvious to those skilled in the art that various modifications may be made to the embodiments described above without departing from the scope of the invention as claimed.

What is claimed is:

1. A loading sleeve for loading a chemical reactor tube with pellets, where the chemical reactor tube is one of a large number of reactor tubes extending from an upper tube sheet to a lower tube sheet, said loading sleeve comprising:
   an upper flange portion for resting on top of the upper tube sheet, said upper flange portion having an outside diameter and defining an opening that is suitable for receiving whole particles that are brushed across the top of the upper tube sheet when the flange is resting on top of the upper tube sheet;
   a rigid upper tubular sleeve portion having a top and a bottom and defining a first longitudinal axis, wherein said upper flange portion is located at the top of said upper tubular sleeve portion, so that the opening of the flange opens into said upper tubular sleeve portion, and wherein said upper tubular sleeve portion projects downwardly from said upper flange portion;
   a rigid lower tubular sleeve portion extending downwardly from said upper tubular sleeve portion and defining a second longitudinal axis;
   wherein the outside diameters of said upper and lower tubular sleeve portions are smaller than the largest outside diameter of the upper flange portion for the entire length of the upper and lower tubular sleeve portions, so that the upper and lower tubular sleeve portions will extend into the reactor tube when the flange is resting on the upper tube sheet, and wherein the inside diameters of said upper and lower tubular sleeve portions are larger than the smallest diameter of the opening in the flange for the entire length of the upper and lower tubular sleeve portions, to ensure that any particles that can pass through the opening in the flange also will flow freely through the entire upper and lower tubular sleeve portions; and
   means for holding said upper and lower tubular sleeve portions together in both an aligned position, in which the first and second longitudinal axes are aligned; and in an unaligned position, in which the first and second longitudinal axes are at a substantial angle relative to each other.

2. A loading sleeve as recited in claim 1, wherein said tubular sleeve portions have a hollow cylindrical shape, and wherein said means for holding said upper and lower sleeve portions together in both an unaligned position and an aligned position includes a hinge member secured to the upper and lower sleeve portions.

3. A loading sleeve as recited in claim 2, wherein said hinge member is a flexible strap.

4. A loading sleeve as recited in claim 2, wherein said hinge member is a spring.

5. A loading sleeve as recited in claim 4, wherein said spring is an elongated coil spring including upper and lower spring portions having inside diameters when at rest that are smaller than the outside diameters of the upper and lower tubular sleeve portions, respectively.

6. A loading sleeve as recited in claim 5, wherein said spring has an intermediate portion, between said upper and lower spring portions, having an at rest inside diameter larger than the outside diameters of the upper and lower tubular sleeve portions.

7. A loading sleeve as recited in claim 4, wherein said spring is a flat spring.

8. A loading sleeve as recited in claim 7, wherein said flat spring has an at rest cross-sectional profile that is arcuate and substantially matches the curvature of the upper and lower tubular sleeve portions.

9. A loading sleeve as recited in claim 2, wherein said hinge member is a bellows.

10. A method for loading a chemical reactor tube with pellets using a loading sleeve, wherein the chemical reactor tube is one of a large number of reactor tubes extending from an upper tube sheet to a lower tube sheet, and wherein the clearance above the upper tube sheet is less than the length of the loading sleeve, comprising the steps of:
   providing a loading sleeve having a rigid upper tubular portion and a rigid lower tubular portion connected together by a hinge means;
   bending the loading sleeve at the hinge means so that the longitudinal axis of the upper tubular portion is at a substantial angle to the longitudinal axis of the lower tubular portion;
   inserting the lower tubular portion into the chemical reactor tube; then
   straightening the loading sleeve so the longitudinal axis of the upper tubular portion is aligned with the longitudinal axis of the lower tubular portion; then
   inserting the upper tubular portion into the chemical reactor tube; then
   inserting pellets into the loading sleeve so the pellets fall down, through the loading sleeve and into the chemical reactor tube; then
   pulling the loading sleeve partially out of the chemical reactor tube; then
   bending the loading sleeve at the hinge means so that the longitudinal axis of the upper tubular portion is at a substantial angle to the longitudinal axis of the lower tubular portion; and then
   pulling the loading sleeve the rest of the way out of the chemical reactor tube.

11. A method for loading a chemical reactor tube with pellets using a loading sleeve as recited in claim 10, wherein the step of inserting pellets into the loading sleeve includes filling the loading sleeve with pellets, and the step of pulling the loading sleeve out of the chemical reactor tube includes leaving the pellets that were inside the loading sleeve in the chemical reactor tube, so that the pellets settle to a desired height within the chemical reactor tube.

* * * * *